S. RICHARDS.
Butter-Gages and Cutters.
No. 153,782. Patented Aug. 4, 1874.
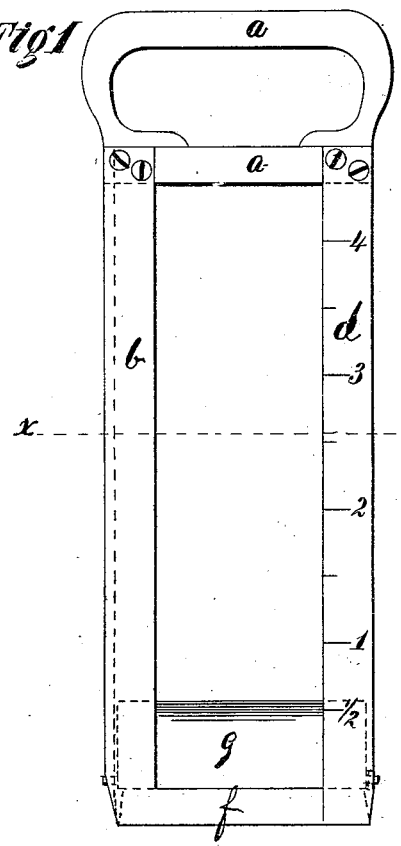
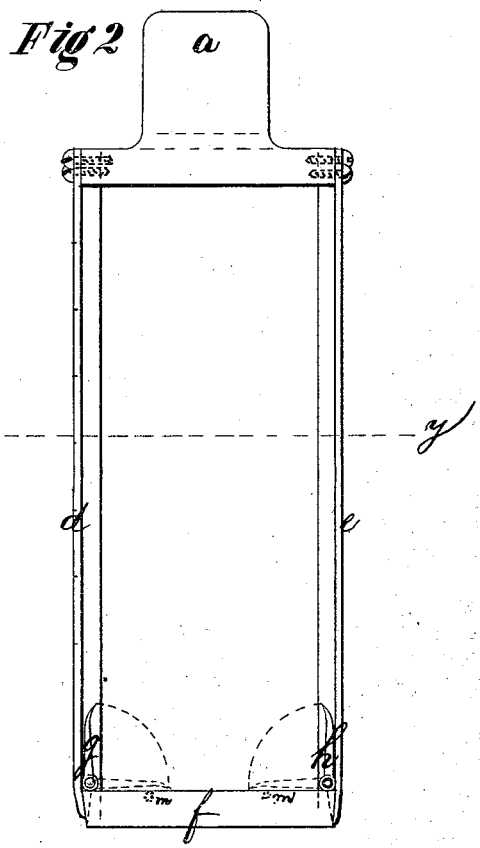
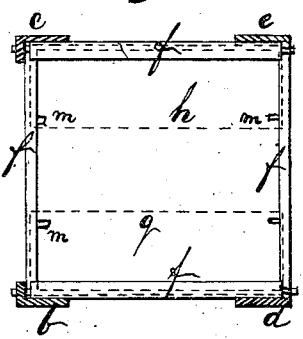
Witnesses:
Stanley Williams
Thomas A. Burtt
Inventor:
Samuel Richards
Philadelphia

UNITED STATES PATENT OFFICE.

SAMUEL RICHARDS, OF PHILADELPHIA, PENNSYLVANIA.

IMPROVEMENT IN BUTTER GAGES AND CUTTERS.

Specification forming part of Letters Patent No. 153,782, dated August 4, 1874; application filed April 3, 1874.

CASE A.

*To all whom it may concern:*

Be it known that I, SAMUEL RICHARDS, of Philadelphia, Pennsylvania, have invented an Implement for Cutting and Gaging Butter, of which the following is a specification:

There is always much difficulty, waste, and inconvenience experienced in cutting regularly-shaped pieces out of inclosed or solid packages, such as barrels, firkins, tubs, &c., of butter, lard, and other like substances. There has existed no means for getting a knife or other implement beneath the pieces to separate them from the solid mass, and the pieces have been in consequence much broken up, and thus rendered unsightly and irregular in form. Frequently the inclosing barrels, firkins, tubs, &c., are necessarily destroyed in the efforts to get the butter or lard out of them.

My invention consists of a cutting device or implement for facilitating the cutting operation above alluded to, which, being graduated, as hereinafter set forth, unbroken pieces of butter, lard, &c., of any desired weight are cut at a single operation without materially disturbing the remaining solid mass.

In the drawings, Figure 1 is a front-side elevation of the implement, one of the two self-adjusting separating-shelves being drawn in an elevated position. Fig. 2 is an elevation of one of the sides adjacent to said front side, showing the two separating-shelves, elevated or in the positions they are pressed into by the insertion of the implement into a solid mass of butter, lard, &c., also showing in dotted lines the said shelves in the position they are pressed into when the user begins to withdraw the implement from the solid mass of butter, lard, &c. Fig. 3 is a horizontal cross-section of the cutter on the line *x y* of Figs. 1 and 2.

*a* is a handle, to which are attached four upright corner-pieces, *b*, *c*, *d*, and *e*. The pieces *b* and *c* are made in angular form to increase their strength. The pieces *d* and *e* are made plain and flat, as shown in Fig. 3, with a view of leaving the side space between these pieces clear of any obstruction to the turning out or easy removal of the butter, lard, &c., from the cutter. The corner-pieces *b c d e* are strength ened by the blades forming the continuous lines shown in Fig. 3 at the bottom. *g* and *h* represent the two self-adjusting separating-shelves, which assume the positions shown in Fig. 2 when the implement is being pushed down or inserted into the solid body of the butter, and said shelves being slightly curved at their free or upper edges, as shown in Fig. 2. They are pressed by the impending butter into the flat position shown in Fig. 3 as soon as the withdrawl of the implement begins.

The sides of the implement are a little drawn in at the bottom. On the sides the shelves are hinged to, so that a cross-section of the implement is slightly less at that point than it is above, and this construction is for the purpose of facilitating the discharge of the butter, lard, &c., from the discharging side of the implement.

The implement may be graduated by marks indicative of pounds or portions of a pound, as shown in Fig. 1, and the necessity of weighing the separate pieces cut from the solid body of the butter, lard, &c., may be thus obviated.

When the shelves *g* and *h* are pressed down, as above described, by the act of withdrawing the cutter or implement from the body of butter, lard, &c., they rest upon pins *m*, as shown, or, being very slightly lengthened, the side edges of these shelves may be caused to rest on top of the adjacent sides of the cutter. The shelves are thus supported in a flat position for sustaining the piece which it is desired to cut out.

I claim—

The combination of the handle *a*, the angular and flat uprights *b c d e*, the blades *f*, the self-adjusting separating-shelves *g* and *h*, with means for supporting the front or free sides of said shelves when they are pressed down flat together, forming an implement for cutting pieces of butter, lard, and other substances of like plastic nature from a solid mass, substantially as set forth.

SAMUEL RICHARDS.

Witnesses:
 D. RICHARDS, Jr.,
 JNO. A. BELL.